(12) United States Patent
Huddleston et al.

(10) Patent No.: US 8,875,650 B2
(45) Date of Patent: Nov. 4, 2014

(54) VALVE ASSEMBLIES INCLUDING VALVE SEAT ASSEMBLIES

(75) Inventors: William Leonard Huddleston, Boonville, IN (US); Mark E. Neufelder, Ft. Branch, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 130 days.

(21) Appl. No.: 13/271,273

(22) Filed: Oct. 12, 2011

(65) Prior Publication Data

US 2013/0092080 A1    Apr. 18, 2013

(51) Int. Cl.
| | |
|---|---|
| *B05B 3/00* | (2006.01) |
| *F16K 47/00* | (2006.01) |
| *F16K 51/00* | (2006.01) |
| *B05B 12/14* | (2006.01) |
| *B05C 5/00* | (2006.01) |
| *B05B 1/30* | (2006.01) |
| *B05B 5/16* | (2006.01) |

(52) U.S. Cl.
CPC . *B05C 5/00* (2013.01); *B05B 12/14* (2013.01); *B05B 1/3013* (2013.01); *B05B 5/16* (2013.01); *F16K 51/00* (2013.01); *Y10S 901/43* (2013.01)
USPC .......... 118/323; 118/321; 251/122; 251/363; 901/43

(58) Field of Classification Search
CPC ............ B05C 5/00; F16K 51/00; B05B 13/04
USPC .......... 118/321, 323; 251/122, 360–364, 332, 251/334; 901/27–29, 43, 49
See application file for complete search history.

(56) References Cited

U.S. PATENT DOCUMENTS

| | | | |
|---|---|---|---|
| 2,917,271 A * | 12/1959 | Banks .......................... | 251/122 |
| 3,219,276 A | 11/1965 | Norris | |
| 3,228,655 A * | 1/1966 | Weise .......................... | 251/362 |
| 3,265,306 A | 8/1966 | Fischer et al. | |
| 3,589,621 A | 6/1971 | Bradley | |
| 3,746,253 A | 7/1973 | Walberg | |
| 3,907,202 A | 9/1975 | Binoche | |
| 4,537,357 A | 8/1985 | Culbertson et al. | |
| 5,169,070 A | 12/1992 | Mattson | |
| 2009/0206182 A1* | 8/2009 | Rodgers et al. ................ | 239/583 |

* cited by examiner

*Primary Examiner* — Yewebdar Tadesse
(74) *Attorney, Agent, or Firm* — Dinsmore & Shohl LLP

(57) ABSTRACT

A valve seat assembly includes a gasket retainer comprising an outer wall, an inner wall, an upper face extending between the outer and inner walls, and a lower face extending between the outer and inner walls. The inner wall defines an insert receiving bore extending from the upper face inwardly toward the lower face to a recess that receives a gasket. A gasket is located in the recess. A retainer insert is located in the insert receiving bore that applies a compressive force to the gasket.

20 Claims, 4 Drawing Sheets

VALVE ASSEMBLIES INCLUDING VALVE SEAT ASSEMBLIES

TECHNICAL FIELD

The present specification generally relates to valve assemblies and, more particularly, to valve assemblies including valve seat assemblies for reliably opening and closing the valve assemblies.

BACKGROUND

Valve assemblies are frequently used where a material, such as a liquid or gas, is being controllably delivered through a system. As one example, paint coating systems for use in coating automobiles may use a number of valves for delivering paint to one or more parts of a vehicle. In some instances, paint color change devices may be used to facilitate paint color changes. Valves may be used in switching from one color to the next color.

Frequently, valve assemblies include parts that come into contact with each other to provide a sealing function. Due to repeated contact, these parts can wear over time thus reducing the reliability of the valve assemblies. Thus, additional valve assemblies are desired that can improve reliability and repeatability of opening and closing of the valve assemblies.

SUMMARY

In one embodiment, a valve seat assembly includes a gasket retainer comprising an outer wall, an inner wall, an upper face extending between the outer and inner walls, and a lower face extending between the outer and inner walls. The inner wall defines an insert receiving bore extending from the upper face inwardly toward the lower face to a recess that receives a gasket. A gasket is located in the recess. A retainer insert is located in the insert receiving bore that applies a compressive force to the gasket.

In another embodiment, a valve assembly includes a valve stem including a sealing end. A valve seat assembly includes a gasket retainer including an outer wall, an inner wall, an upper face extending between the outer and inner walls, and a lower face extending between the outer and inner walls. The inner wall defines an insert receiving bore extending from the upper face inwardly toward the lower face to a recess that receives a gasket. A gasket located in the recess. A retainer insert is located in the insert receiving bore. The retainer insert includes an inner wall defining a valve stem receiving bore through which the valve stem extends such that the sealing end of the valve stem engages the gasket in a closed configuration and disengages the gasket in an open configuration.

In another embodiment, a paint coating system includes a paint coating robot comprising an arm assembly and a coating apparatus for urging paint toward a work piece. A valve assembly controls paint delivery to the paint coating robot. The valve assembly includes a valve stem including a sealing end and a valve seat assembly. The valve seat assembly includes a gasket retainer including an outer wall, an inner wall, an upper face extending between the outer and inner walls, and lower face extending between the outer and inner walls. The inner wall defines an insert receiving bore extending from the upper face inwardly toward the lower face to a recess that receives a gasket. A gasket is located in the recess. A retainer insert is located in the insert receiving bore. The retainer insert includes an inner wall defining a valve stem receiving bore through which the valve stem extends such that the sealing end of the valve stem engages the gasket in a closed configuration and disengages the gasket in an open configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to valve assemblies for delivery systems that include a valve seat assembly for use in reliably and repeatably opening and closing the valve assemblies. The valve seat assembly generally includes a gasket retainer that is sized to receive a gasket and a retainer insert that can apply pressure to the gasket once the valve seat assembly is assembled. The gasket has a portion that is exposed by the retainer insert to provide a seat for contacting a stem valve. The valve assemblies may be useful in paint coating systems. While the valve assemblies will be described below in the context of a paint coating system, they may be used in other systems where fluids (i.e., liquids and gases) are controllably delivered from one location to another. Additional details of the valve assemblies including the valve seat assembly are described below.

Figure 1:
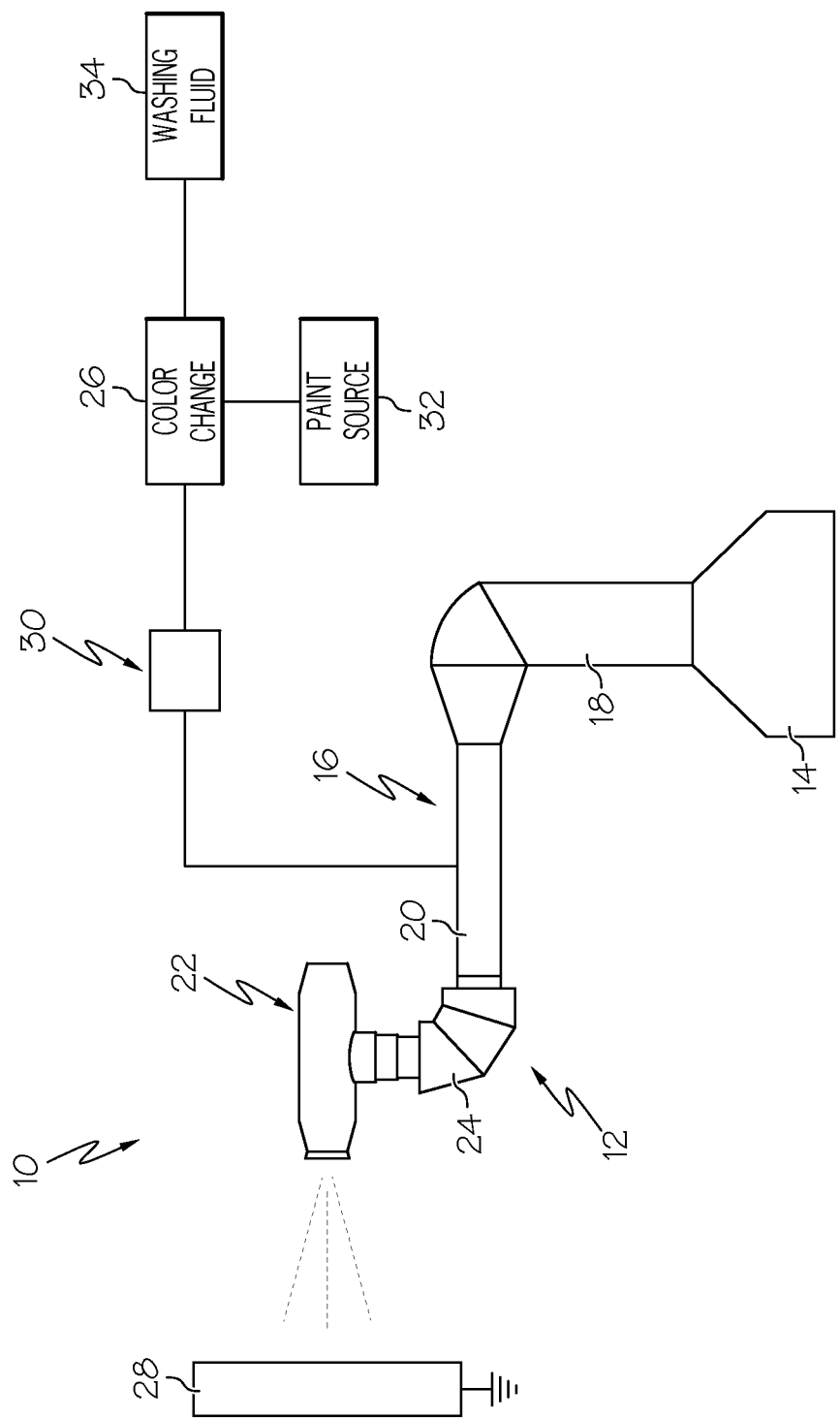
FIG. 1 is a diagrammatic illustration of a paint coating system including one or more valve assemblies according to one or more embodiments described herein.

Referring to FIG. 1, a paint coating system 10 includes a paint coating robot 12 that includes a mounting base 14 and an arm assembly 16 that is rotatably and pivotally mounted to the mounting base 14. The arm assembly 16 includes a vertical portion 18 that is mounted to the mounting base 14 and a horizontal portion 20 that is rotatably and pivotally mounted to the vertical portion 18. A coating apparatus 22 may be rotatably and pivotally mounted to the horizontal portion 20 at a wrist 24. As one example, the coating apparatus 22 may be an atomizing head type coating apparatus. The coating apparatus 22 may be connected to a color change valve device 26. The color change valve device 26 may be mounted directly to the paint coating robot 12 or may be separate from the paint coating robot 12. The color change device 26 may allow for selective supply of multiple paint colors, cleaning and/or wash fluids to the coating apparatus 22. The paint particles may be charged with a high voltage by a high voltage generator in the coating apparatus 10. The charged paint particles may be urged to fly toward a work piece 28 which is connected to ground, and efficiently deposited on a surface of the work piece 28.

A valve assembly (represented by element 30) may be connected between a paint source 32 and the coating apparatus 22. As one example, the valve assembly 32 may be part of the color change valve device 26. In other embodiments, the valve assembly 30 may be part of the paint coating robot 12 or other device. The valve assembly 30 can be used to controllably deliver paint, cleaning and/or wash fluids (e.g., thinners, air, etc.) to the coating apparatus. Additionally, multiple valve assemblies 30 may be used in the paint coating system 10 at various locations. For example, the color change valve device 26 may include multiple valve assemblies 30 for controlling delivery of the multiple paint colors to the coating apparatus 22. Another valve assembly 30 may be provided between a washing fluid source 34 and the coating apparatus 22 for controllably delivering washing fluid to the coating apparatus 22 (e.g., between paint color changes).

Figure 2:
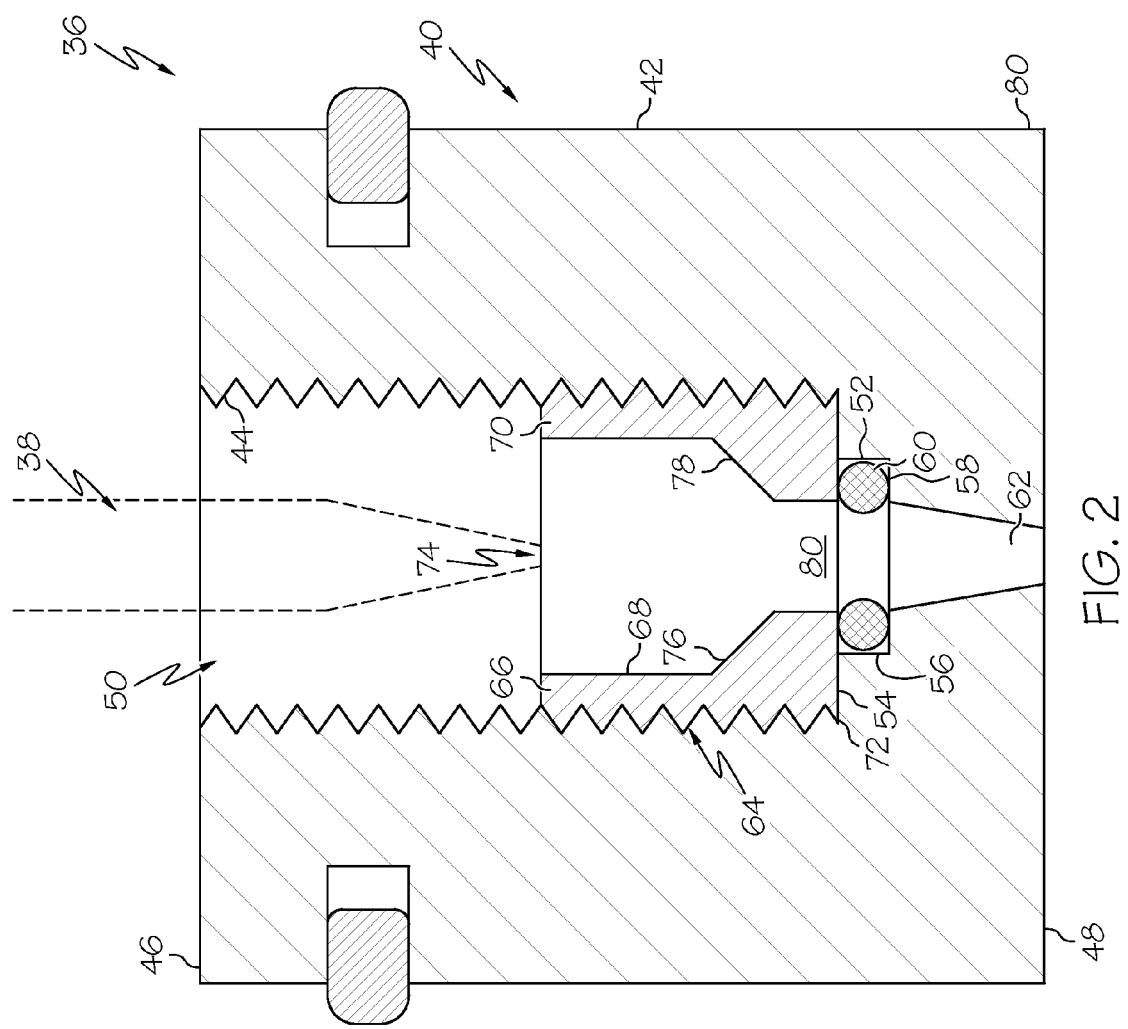
FIG. 2 is a side, section view of a valve assembly for use in the paint coating system of FIG. 1 according to one or more embodiments described herein.

Referring to FIG. 2, the valve assembly 30 is illustrated in isolation and includes a valve seat assembly 36 and a valve member (shown by dotted lines 38). The valve seat assembly 36 includes a gasket retainer 40 having an outer wall 42, an inner wall 44, an upper face 46 and a lower face 48. The gasket retainer 40 may be generally cylindrical in shape, however, other shapes may be used such as various polygon shapes. An insert receiving bore 50 is provided within the gasket retainer 40 that extends from the upper face 46 inwardly toward the lower face 48 to a recess 52 defined within a floor surface 54 of the gasket retainer 40. The recess 52 has a width or diameter that is less than a diameter of the insert receiving bore 50 and includes a vertical peripheral wall 56 and a gasket seat 58 that receives a gasket 60 (e.g., a rubber or plastic o-ring). A flow opening 62 extends from the lower face 48 to the recess 52 for providing fluid communication through the valve assembly 30.

Figure 3:
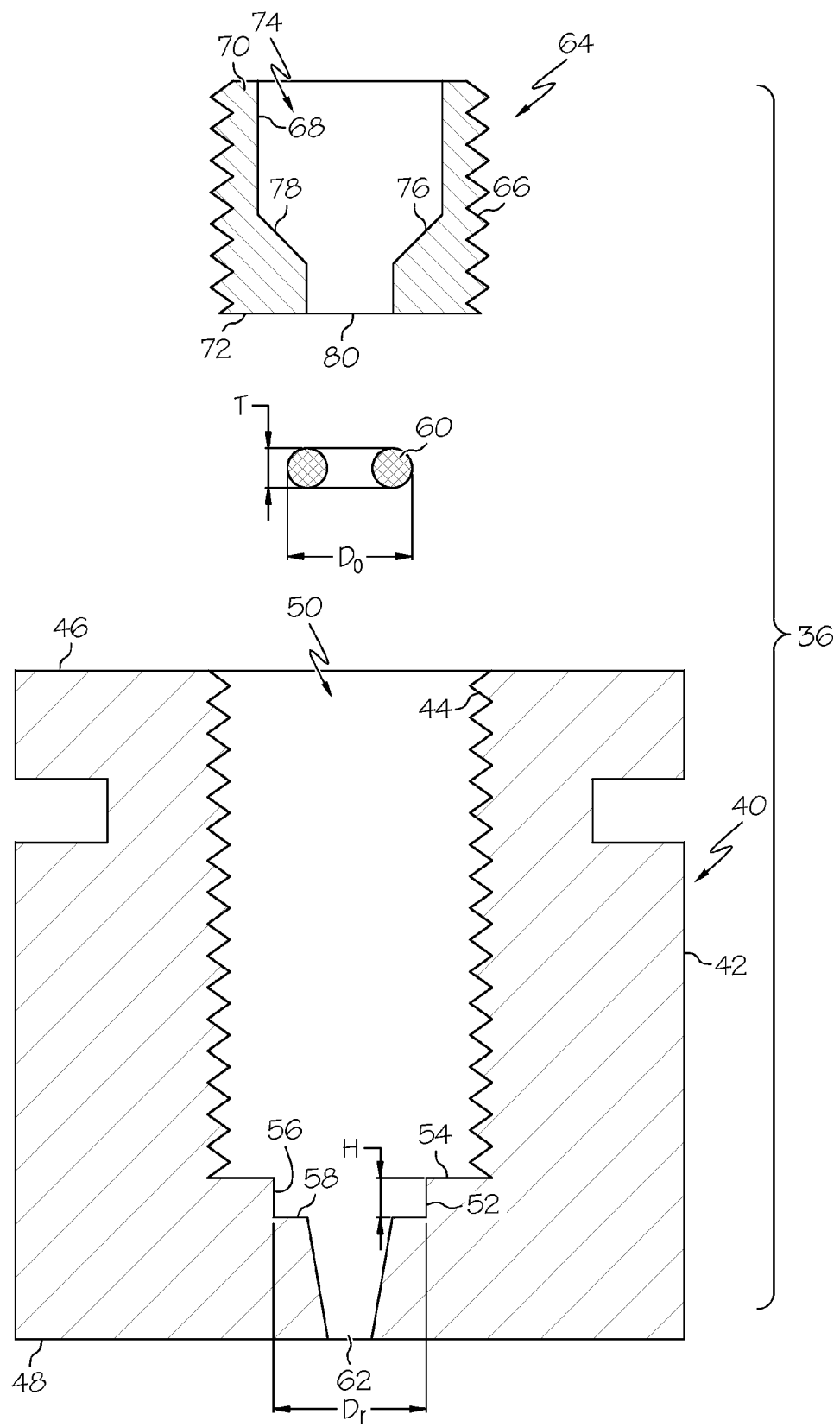
FIG. 3 is an exploded view of the valve assembly of FIG. 2 according to one or more embodiments described herein.

In the illustrated embodiment, the inner wall 44 of the gasket retainer 40 is threaded to threadably receive a retainer insert 64. Referring also to FIG. 3, the retainer insert 64 includes a threaded outer wall 66, an inner wall 68, an upper face 70 and a lower face 72. The threads of the threaded outer wall 66 of the retainer insert 64 mate with the threads of the threaded inner wall 44 of the gasket retainer 40 to provide a threaded connection therebetween. Other connections may be provided, such as a press-fit connection. The retainer insert 64 may be generally cylindrical in shape, however, other shapes may be used such as various polygon shapes. A valve stem receiving bore 74 is provided within the retainer insert 64 that extends from the upper face 70 toward the lower face 72 to a necked-down region 76 formed by a surface 78 extending at an angle to vertical. The necked-down region 76 extends to a flow opening 80 that extends from the lower face 72 to the necked-down region 76 for providing fluid communication through the valve assembly 30.

The gasket 60 is located between the retainer insert 64 and the gasket retainer 40. More particularly, the gasket 60 is illustrated as sandwiched between the lower face 72 of the retainer insert 64 and the gasket seat 58 of the gasket retainer 40. Referring to FIG. 3, in some embodiments, the gasket 60 has an undeflected thickness T that is greater than a height H of the vertical peripheral wall 56. Such an arrangement allows the retainer insert 64 to apply a compressive force to the gasket 60 once the retainer insert is seated within the gasket retainer 40. In some embodiments, the gasket 60 may have a width or outer diameter $D_o$ that is greater than the width or diameter $D_r$ of the recess 52. Such an arrangement can also allow for radial compression of the gasket 60. Such axial and radial compression of the gasket 60 can provide a reliable seal in static and dynamic applications and can limit both axial and rotational movement of the gasket 60 during use.

Figure 4:
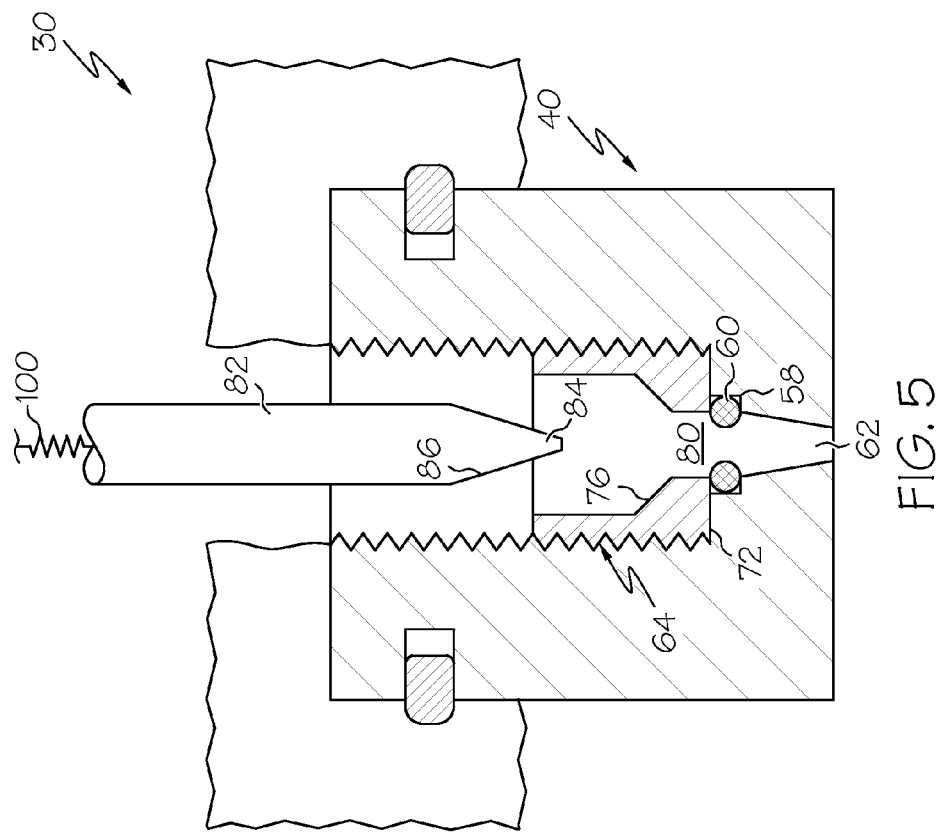
FIG. 4 is a side, diagrammatic view of the valve assembly of FIG. 2 in a closed configuration according to one or more embodiments described herein.
Figure 5:
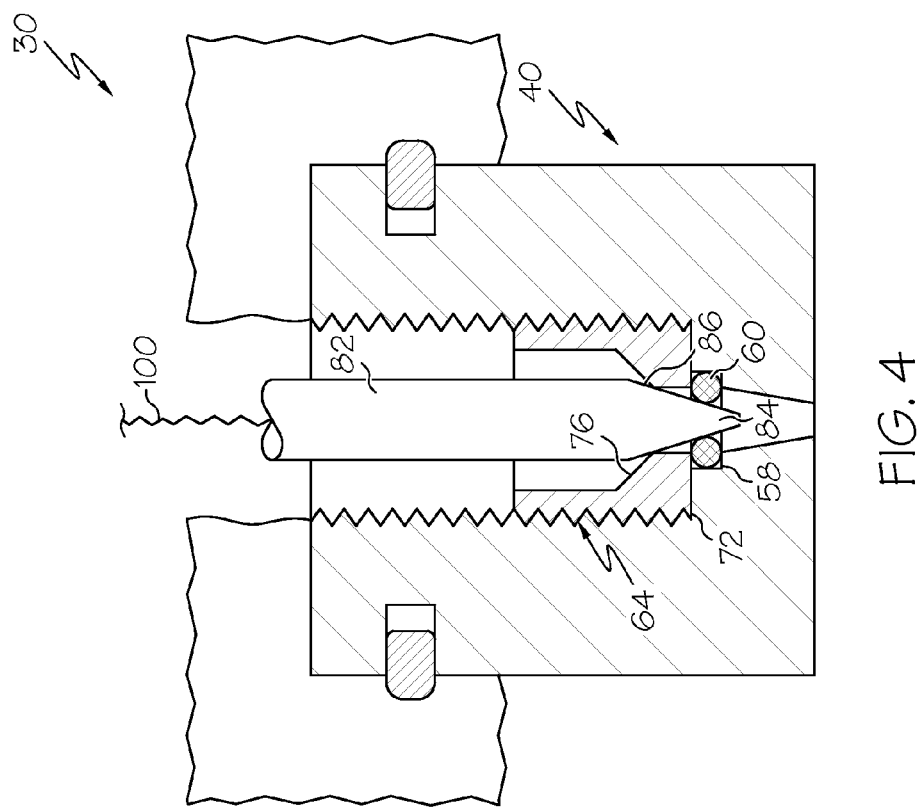
FIG. 5 is a side, diagrammatic view of the valve assembly of FIG. 2 in an open configuration according to one or more embodiments described herein.

Referring to FIGS. 4 and 5, operation of the valve assembly 30 will be discussed. FIG. 4 illustrates the valve assembly 30 in a closed configuration, inhibiting egress and/or ingress of fluids such as paint, wash or cleaning fluids, air or other gas through the flow openings 62 and 80. The valve stem 82 may normally be spring-biased by spring 100 toward the closed configuration and include a sealing end 84 having an inwardly tapered sealing surface 86 that engages the necked-down region 76 of the retainer insert 64. The sealing end 84, in the closed configuration, may extend downwardly into the flow openings 62 and 80, beyond the gasket 60 and sealingly engage the axially and radially compressed gasket 60 sandwiched between the lower face 72 of the retainer insert 64 and the gasket seat 58 of the gasket retainer 40. To this end, the gasket 60, in addition to being a sealing member, may also provide a stop that inhibits movement of the valve stem 82 with the valve stem in the closed configuration. Radial compression of the gasket 60 can also bias the gasket 60 radially toward the sealing surface 86 thereby enhancing sealing. FIG. 5 illustrates the valve assembly in an open configuration, allowing egress and/or ingress of fluids such as paint, wash or cleaning fluids, air or other gas. In this open configuration, the bias of the spring may be overcome, for example through application of pressurized fluid, operator or automated control and the sealing end 82 of the valve stem 82 lifts from the gasket 60 and the necked-down region 76 of the retainer insert 64 thereby allowing fluid into or out of the valve assembly 30.

Any suitable materials and processes may be used in forming the valve seat assembly 36 including the gasket retainer 40 and the retainer insert 64. Suitable materials may include various plastics such as PVC and ABS and metals such as steel, iron and the like. Any suitable processes may be used such as molding, machining and/or casting. A gasket in the form of an o-ring is shown above. The o-ring may be formed of a flexible and resilient material such as plastics and rubber.

The above-described valve assemblies 30 can incorporate a replaceable (e.g., rubber or plastic) gasket, for example, to eliminate direct seating between the valve stem and another joined component, such as a manifold. The gasket can provide a reliable seal in both static and dynamic applications. Providing the gasket can also allow for cleaning of the valve stem of liquids as the valve stem is moved along the gasket. The gasket can be replaceable, which can provide sealing over relatively long periods of time. The valve assemblies may also be retrofitted into existing systems by varying internal and external clearances of the seating components.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A valve seat assembly comprising:
   a gasket retainer comprising:
   an outer wall;
   an inner wall;
   an upper face extending between the outer and inner walls;
   a lower face extending between the outer and inner walls;

the inner wall defining an insert receiving bore extending from the upper face inwardly toward the lower face to a recess configured to receive a gasket, the gasket located in the recess; and a retainer insert located in the insert receiving bore that applies a compressive force to the gasket, the retainer insert having a valve stem receiving bore extending therethrough including a necked-down region formed by an inwardly tapered surface of the valve stem receiving bore that extends to a flow opening within the valve stem receiving bore, the necked down region providing the valve stem receiving bore with a reduced opening width at the flow opening.

2. The valve seat assembly of claim 1, wherein the retainer insert has the flow opening at a lower face of the retainer insert that is sized such that the gasket is exposed through the flow opening.

3. The valve seat assembly of claim 1, wherein the inner wall of the gasket retainer includes threads that mate with threads of an outer wall of the retainer insert.

4. The valve seat assembly of claim 1, wherein the recess has a diameter that is less than a diameter of the insert receiving bore thereby defining a floor surface for the retainer insert.

5. The valve seat assembly of claim 4, wherein the recess is defined within a peripheral wall extending vertically from a gasket seat, the peripheral wall having a height that is less than an undeflected thickness of the gasket.

6. The valve seat assembly of claim 1, wherein the gasket retainer and the retainer insert both include flow openings to allow fluid flow through the valve seat assembly.

7. The valve seat assembly of claim 1, wherein the retainer insert comprises:
   an outer wall;
   an inner wall;
   an upper face extending between the outer and inner walls; and
   a lower face extending between the outer and inner walls;
   the inner wall of the retainer insert defining the valve stem receiving bore extending from the upper face of the retainer insert toward the lower face of the retainer insert to the necked-down region having the inwardly tapered surface located spaced from the upper face and the lower face.

8. A valve assembly comprising:
   a valve stem including a sealing end; and
   a valve seat assembly comprising:
      a gasket retainer comprising
         an outer wall;
         an inner wall;
         an upper face extending between the outer and inner walls;
         a lower face extending between the outer and inner walls;
         the inner wall defining an insert receiving bore extending from the upper face inwardly toward the lower face to a recess configured to receive a gasket, the gasket located in the recess; and
      a retainer insert located in the insert receiving bore, the retainer insert comprising an inner wall having an inwardly tapered surface defining a valve stem receiving bore through which the valve stem extends such that the sealing end of the valve stem engages the gasket in a closed configuration and disengages the gasket in an open configuration;
      wherein the valve stem receiving bore includes a necked-down region formed by the inwardly tapered surface of the valve stem receiving bore that extends to a flow opening within the valve stem receiving bore, the sealing end of the valve stem engages the necked-down region in the closed configuration.

9. The valve assembly of claim 8, wherein the retainer insert applies a compressive force to the gasket.

10. The valve assembly of claim 8, wherein the retainer insert has the flow opening at a lower face of the retainer insert that is sized such that the gasket is exposed through the flow opening to engage the sealing end of the valve stem in the closed configuration.

11. The valve assembly of claim 8, wherein the inner wall of the gasket retainer includes threads that mate with threads of an outer wall of the retainer insert.

12. The valve assembly of claim 8, wherein the recess has a diameter that is less than a diameter of the insert receiving bore thereby defining a floor surface for the retainer insert.

13. The valve assembly of claim 12, wherein the recess is defined within a peripheral wall extending vertically from a gasket seat, the peripheral wall having a height that is less than an undeflected thickness of the gasket.

14. The valve assembly of claim 8, wherein the gasket retainer and the retainer insert both include flow openings to allow fluid flow through the valve seat assembly with the valve assembly in the open configuration.

15. The valve assembly of claim 8, wherein the retainer insert comprises:
   an outer wall;
   the inner wall;
   an upper face extending between the outer and inner walls; and
   a lower face extending between the outer and inner walls;
   the inner wall of the retainer insert defining the valve stem receiving bore extending from the upper face of the retainer insert inwardly toward the lower face of the retainer insert to the necked-down region having the inwardly tapered surface located spaced from the upper face and the lower face.

16. A paint coating system comprising:
   a paint coating robot comprising an arm assembly and a coating apparatus for urging paint toward a work piece; and
   a valve assembly that controls paint delivery to the paint coating robot, the valve assembly comprising:
      a valve stem including a sealing end; and
      a valve seat assembly comprising:
         a gasket retainer comprising
            an outer wall;
            an inner wall;
            an upper face extending between the outer and inner walls;
            a lower face extending between the outer and inner walls;
            the inner wall defining an insert receiving bore extending from the upper face inwardly toward the lower face to a recess configured to receive a gasket, the gasket located in the recess; and
         a retainer insert located in the insert receiving bore, the retainer insert comprising an inner wall defining a valve stem receiving bore through which the valve stem extends such that the sealing end of the valve stem engages the gasket in a closed configuration and disengages the gasket in an open configuration;
         wherein the valve stem receiving bore includes a necked-down region formed by an inwardly tapered surface of the valve stem receiving bore that extends to a flow opening within the valve stem receiving bore, the sealing end of the valve stem engages the necked-down region in the closed configuration.

17. The paint coating system of claim 16, wherein the retainer insert applies a compressive force to the gasket.

18. The paint coating system of claim 16, wherein the retainer insert has the flow opening at a lower face of the retainer insert that is sized such that the gasket is exposed through the flow opening to engage the sealing end of the valve stem in the closed configuration.

19. The paint coating system of claim 16, wherein the inner wall of the gasket retainer includes threads that mate with threads of an outer wall of the retainer insert.

20. The paint coating system of claim 16, wherein the recess has a diameter that is less than a diameter of the insert receiving bore thereby defining a floor surface for the retainer insert, wherein the recess is defined within a peripheral wall extending vertically from a gasket seat, the peripheral wall having a height that is less than an undeflected thickness of the gasket.

* * * * *